Patented Mar. 26, 1935

1,995,930

UNITED STATES PATENT OFFICE 1,995,930

PROCESS FOR MAKING TRIMETHYL ACETIC ACID

Alfred T. Larson, Wilmington, Del., assignor to E. I. du Pont de Nemours & Company, Wilmington, Del., a corporation of Delaware No Drawing. Application February 25, 1933, Serial No. 658,661

14 Claims. (Cl. 260—116)

This invention relates to the synthesis of trimethyl acetic acid and more particularly to the preparation of trimethyl acetic acid by the interaction of isobutanol and carbon monoxide.

Trimethyl acetic acid, variously called pivalic acid, dimethyl-propane acid, and having the structural formula $(CH_3)_3$—C.COOH, may be formed from tertiary butyl iodide by means of the cyanide in accord with the reaction disclosed by Butleroff in 1873. It has also been prepared by the oxidation of pinacoline. Such methods of preparation are necessarily expensive due principally to the relative high cost of raw materials.

Owing to the many important uses to which this type of acid is adapted, many of which uses have not been exploited extensively due to its relatively high cost, it is obvious that a process for the preparation of trimethyl acetic acid from raw materials, which are, at present, readily available and which will be even more readily available in the near future, will be of far reaching importance in this art.

It is an object of the present invention to provide a process for the synthesis of trimethyl acetic acid from simpler and less costly raw materials than have previously been used. Other objects and advantages will hereinafter appear.

I have found that trimethyl acetic acid can be produced by the reaction of steam, carbon monoxide, and isobutanol. The reaction may be conducted in the presence or absence of steam,—with steam the acid is usually produced in greater quantity than the butyl ester of the acid, in the absence of steam the reverse is generally true. The reaction apparently proceeds in accord with the equation—

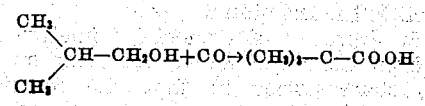

while one would expect to obtain not the trimethyl acetic acid but beta beta dimethyl propionic acid.

Raw materials suitable for use in the process are readily available from a number of sources. Thus, isobutanol obtained from the fermentation of grain or potatoes or from the catalytic hydrogenation of carbon oxides under pressure in accord with the description of such processes to be found in U. S. Patents Lazier 1,746,781, Larson 1,844,587, Williams Re. 18,302. It is preferable, for the sake of avoiding undesirable by-products, that the alcohol be employed in a relatively high degree of purity. The carbon monoxide required for the synthesis may conveniently be derived from various commercial sources, such as, for example, water gas, producer gas, etc., by liquefaction or other means, and should likewise for the best results be relatively pure, it being particularly desirable to avoid the presence therein of sulfur compounds, metallic carbonyls, and the like.

Inert gases, such as nitrogen, methane, and carbon dioxide, may be included with the reaction, this being advantageous in some cases from the standpoint of controlling the temperature of the exothermic reaction and of limiting the expense thereof, where it may be desired to restrict the overall conversion of the reaction for the sake of enhancing the relative yield of the desired acid. When employing one or more of the above gases as inert carriers to effect these advantages, it or they should generally be present in amounts constituting approximately 40% or more by volume of the whole gaseous mixture, including the steam.

The relative proportions of the reactants can be varied, although it has been found that in order to avoid side reactions involving the alcohol it is advantageous to work with steam and carbon monoxide in excess with respect to the alcohol. Concentrations of the latter within the range of from 1½ to 10% by volume of the total reaction with pressures of 500 atmospheres or more, have given particularly good results. Higher concentrations may be used, however, if desired, but under such conditions correspondingly lower pressures should be employed.

The use of pressures in excess of atmospheric, say, from 25–900 atmospheres, is preferred. The reaction proceeds over a wide range of temperatures while working under these pressures, although the optimum temperature varies with specific ratios of the alcohol to carbon monoxide and steam. Generally speaking, the desired reaction can be obtained at from 200–500° C. From the standpoint of practical operation the temperature should not be so low that the reaction rate is uneconomical, nor so high as to result in undesirable by-products by decomposition of the alcohols and the acids produced. From this point of view the process has been found to operate satisfactorily at from 275–375° C.

The following example will illustrate a method of practicing the invention, altho the invention is not limited by the example:

A gaseous mixture consisting of 83.4% of carbon monoxide, 12.1% of steam, 4.1% of isobutanol, and 0.4% hydrogen chloride, all in per cent by weight, was passed, at a pressure of approximately 700 atmospheres and a temperature of approximately 300° C. into a catalytic reaction chamber containing activated carbon. A condensate was obtained, upon cooling the converted gases, containing an upper and a lower layer. The upper layer contained 77.8% trimethyl acetic acid, 2.8% of the butyl ester of trimethyl acetic acid, and 20.3% of unconverted isobutanol. The lower layer contained 4.8% formic acid and approximately 0.6% of the butyl ester of trimethyl acetic acid.

A number of catalysts may be employed to accelerate the reaction and include generally inorganic acids that are not substantially volatilized at the temperature of the synthesis, e. g. acids of phosphorus, arsenic, and boron. Activated charcoal alone has proven to be a good catalyst for the reaction and when used in conjunction with the inorganic acids, particularly so. The following catalysts may likewise be employed: calcium chloride, cadmium phosphate, silica-tungstic acid, zinc chloride, calcium chloride, calcium iodide, sodium bromide, and potassium chloride. In fact, any catalyst capable of promoting the synthesis of aliphatic acids from carbon monoxide and alcohols are suitable.

The apparatus, which may be employed for conducting these reactions, may be of any conventional type and preferably one in which the temperature of exothermic reactions can be readily controlled at the desired value. Owing to the corrosive action of the trimethyl acetic acid produced, the interior of the converter and conduit leading therefrom should preferably be protected. This may be accomplished by using glass or glass-lined apparatus, or by coating the inner surfaces of the apparatus with chromium, or silver, or using for the construction of this equipment acid-resisting alloys of, for example, molybdenum, cobalt, tungsten, manganese, or nickel.

From a consideration of the above specification it will be realized that any process for the preparation of trimethyl acetic acid by the interaction of isobutanol with carbon monoxide will come within the scope of this invention, providing the reaction be effected in accord with the above disclosed invention.

I claim:

1. The process of reacting isobutanol and carbon monoxide and thereby producing trimethyl acetic acid substantially in accord with the following equation:

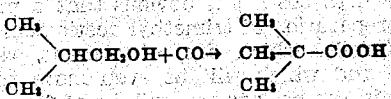

2. The process of reacting isobutanol and carbon monoxide and thereby producing trimethyl acetic acid.

3. The process of reacting isobutanol and carbon monoxide in the presence of a catalyst capable of promoting the synthesis of aliphatic acids from carbon monoxide and alcohols and thereby producing trimethyl acetic acid.

4. A process of producing trimethyl acetic acid from isobutanol, steam, and carbon monoxide, characterized in that an excess of steam and carbon monoxide is employed with relation to the isobutanol.

5. In a process of producing trimethyl acetic acid from isobutanol, steam, and carbon monoxide, characterized in that the reaction is effected under a pressure within the range of from 25 to 900 atmospheres.

6. In a process of producing trimethyl acetic acid from isobutanol, steam, and carbon monoxide, characterized in that the reaction is effected at a temperature within the range of 200–500° C.

7. In a process for the preparation of trimethyl acetic acid from isobutanol, steam, and carbon monoxide, characterized in that the reaction is effected in the presence of a catalyst capable of promoting the synthesis of aliphatic acids from carbon monoxide and alcohols.

8. In a process for the preparation of trimethyl acetic acid from isobutanol, steam, and carbon monoxide, the step which comprises effecting the reaction in the presence of a hydrogen halide as the catalyst therefor.

9. In a process for the preparation of trimethyl acetic acid from isobutanol, steam, and carbon monoxide, the step which comprises effecting the reaction in the presence of a hydrogen halide and activated carbon as the catalyst therefor.

10. The process of reacting isobutanol and carbon monoxide by the simultaneous action of heat and pressure and thereby producing trimethyl acetic acid substantially in accord with the following equation:

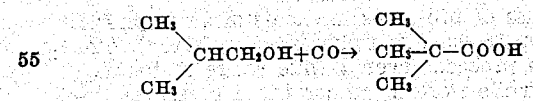

11. The process of reacting isobutanol and carbon monoxide by the simultaneous action of heat and pressure and thereby producing trimethyl acetic acid.

12. The process of reacting isobutanol and carbon monoxide by the simultaneous action of heat and pressure in the presence of a catalyst capable of promoting synthesis of aliphatic acids from carbon monoxide and alcohols and thereby producing trimethyl acetic acid.

13. A process of producing trimethyl acetic acid from isobutanol, steam, and carbon monoxide, by the simultaneous action of heat and pressure, characterized in that an excess of steam and carbon monoxide is employed with relation to the isobutanol.

14. In a process of producing trimethyl acetic acid from isobutanol, steam, and carbon monoxide, characterized in that the reaction is effected under a pressure within the range of from 25–900 atmospheres and at a temperature within the range of 200–500° C.

ALFRED T. LARSON.